Aug. 16, 1932.        R. O. HELGEBY        1,872,288
INSTRUMENT DRIVE
Filed Feb. 1, 1928
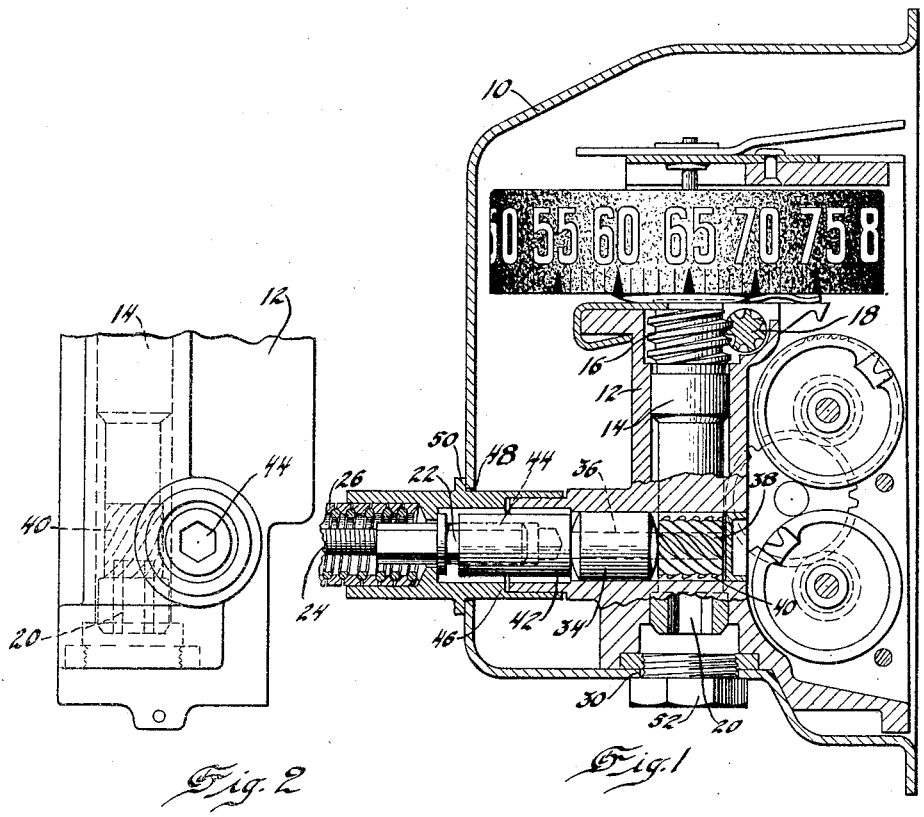
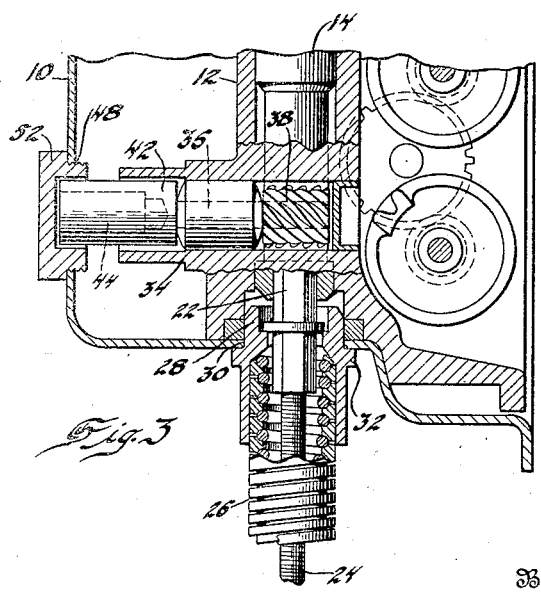
Inventor
Ralph O. Helgeby
By Blackmore, Spencer & Finch
Attorneys Patented Aug. 16, 1932

1,872,288

UNITED STATES PATENT OFFICE

RALPH O. HELGEBY, OF FLINT, MICHIGAN, ASSIGNOR TO A C SPARK PLUG COMPANY, OF FLINT, MICHIGAN, A COMPANY OF MICHIGAN

INSTRUMENT DRIVE

Application filed February 1, 1928. Serial No. 251,144.

My invention relates to indicating instruments and more particularly to combined speed and mileage indicating instruments such as are used in connection with motor vehicles.

Usually the manufacturer of such instruments sells them to several different vehicle makers. Due to the different ways the instruments are to be mounted and to the different types of bodies, one maker may desire that the instrument be driven from the underside, while another may wish to have it driven from the back of the instrument.

The principal object of my invention is to provide an instrument which is constructed in such a manner that its driving means may be connected to it either at its underside or at its back. This enables the instrument manufacturer to concentrate his production on one type of instrument instead of two and consequently the cost is lowered.

Other objects and advantages will be apparent in the specification and accompanying drawing in which:

Figure 1 is a vertical section through my improved indicating instrument, showing the driving mechanism connected to the back of the instrument.

Figure 2 is a fragmentary back view of the instrument shown in Figure 1.

Figure 3 is a fragmentary view corresponding to Figure 1, but showing the driving mechanism connected to the bottom of the instrument.

The reference numeral 10 indicates the casing of a combined speed and mileage indicating instrument. Vertically journalled in the instrument frame 12 is a rotor shaft 14, to the upper end of which is secured the usual means for actuating the speed indicating mechanism. A worm gear 16 formed on the shaft drives a gear 18 which actuates the mileage indicating mechanism. The lower end of the shaft 14 is provided with an irregular shaped opening 20 adapted to receive a correspondingly shaped tip 22 on the end of a flexible shaft 24 which is driven in the usual manner from the transmission or other part of the vehicle. A flexible tube 26 encases and protects this flexible shaft, and has secured to its upper end a sleeve 28 which fits into an opening 30 in the casing opposite the shaft 14, as shown in Figure 3. A flange 32 on the sleeve limits the movement of the sleeve into the casing, and also may be used to secure the flexible casing in place by means of a clamp fastened to the casing and bearing against the flange 32. However, any suitable fastening means may be used.

It is sometimes necessary or desirable to have the flexible driving mechanism approach the instrument from a horizontal position. In order to permit this, the frame is provided with a passage extending at right angles to the shaft 14. In this passage is pressed a bearing member 34 in which is journalled a shaft 36. A worm gear 38 is pressed on one end of the shaft and meshes with worm teeth 40 cut on the rotor shaft 14. The opposite end of the shaft 36 has formed on it an enlarged portion 42 in which is provided an irregular shaped opening 44. When it is desired to have the driving mechanism approach the instrument from a horizontal position, a flexible casing 26 having a sleeve 46 secured to it is used as shown in Figure 1. This sleeve is inserted in an opening 48 in the casing until the flange 50 on the sleeve engages the casing, where it is held in place in the same manner as when used in a vertical position. The tip 22 fits into the opening 44 and drives the shaft 36 which through the worm gears 38 and 40 drives the rotor shaft 14. A plug 52 is provided to close the opening 30 when the instrument is driven from a horizontal position and to close the opening 48 when driven from a vertical position.

It will be apparent that by constructing the instrument as shown, that the manufacturer may concentrate all his efforts on one model of instrument, instead of two as would usually be the case, and thereby lower the manufacturing cost. Of course, when it is known that a vehicle maker is only going to use a vertical type drive, the shaft 36, bearing member 34 and worm gear 38 may be omitted.

It is thought from the foregoing taken in connection with the accompanying drawing that the construction and operation of device will be apparent to those skilled in the art, and that various changes in size, shape and proportion and details of construction may be made without departing from the spirit and scope of the appended claims.

I claim:

1. In an indicating instrument, a frame for said instrument having a circular bore formed therein, a shaft journalled in said bore, a second circular bore at an angle to said first named bore, a second shaft adapted to be rotatably supported in said second bore, gearing connecting said first and second shafts, and driving mechanism for said instrument having a non-circular end, the outer ends of both said first and second shafts being shaped to receive the non-circular end of said driving mechanism whereby the latter may be connected to one shaft when it is desired to have the driving mechanism approach the instrument in one position, or to the other shaft when it is desired to have the driving mechanism approach the instrument in a different position.

2. In an indicating instrument, a frame for said instrument having a circular bore formed therein, a shaft journalled in said bore, a second circular bore at an angle to said first named bore, a second shaft adapted to be rotatably supported in said second bore, gearing connecting said first and second shafts, driving mechanism for said instrument, and cooperating means on said driving mechanism and said first and second shafts adapted to effect a driving connection between said driving mechanism and one shaft when it is desired to have the driving mechanism approach the instrument in one position or to the other shaft when it is desired to have the driving mechanism approach the instrument in a different position.

In testimony whereof I affix my signature.

RALPH O. HELGEBY.